(12) United States Patent
Loprieno et al.

(10) Patent No.: US 8,942,379 B2
(45) Date of Patent: Jan. 27, 2015

(54) TIMESLOT ENCRYPTION IN AN OPTICAL TRANSPORT NETWORK

(71) Applicant: Cisco Technology, Inc., San Jose, CA (US)

(72) Inventors: Gilberto Loprieno, Milan (IT); Giacomo Losio, Tortona (IT)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 13/653,521

(22) Filed: Oct. 17, 2012

(65) Prior Publication Data

US 2014/0133653 A1  May 15, 2014

(51) Int. Cl.
*H04K 1/00*  (2006.01)
*H04L 9/32*  (2006.01)
*H04L 29/06*  (2006.01)

(52) U.S. Cl.
CPC ............ *H04L 9/3297* (2013.01); *H04L 9/3226* (2013.01); *H04L 63/083* (2013.01)
USPC ........................................................ 380/256

(58) Field of Classification Search
CPC .................................................... H04L 9/3297
USPC ........................................................ 380/256
See application file for complete search history.

(56) References Cited

U.S. PATENT DOCUMENTS

| | | | |
|---|---|---|---|
| 7,124,296 B2 * | 10/2006 | Krishna et al. ................. | 713/161 |
| 7,158,637 B2 * | 1/2007 | Ohta et al. ........................ | 380/37 |
| 7,831,825 B2 * | 11/2010 | Milliken et al. ............... | 713/160 |
| 8,270,599 B2 * | 9/2012 | Verghese et al. ................. | 380/29 |
| 8,699,506 B2 * | 4/2014 | Taniguchi et al. ............ | 370/442 |
| 2008/0270785 A1 | 10/2008 | Loprieno et al. | |
| 2009/0080646 A1 * | 3/2009 | Yen .................................. | 380/28 |
| 2009/0119510 A1 * | 5/2009 | Long et al. ..................... | 713/171 |
| 2010/0138648 A1 * | 6/2010 | Nishikawa et al. ........... | 713/151 |
| 2012/0084438 A1 | 4/2012 | Raleigh et al. | |
| 2014/0006797 A1 * | 1/2014 | Cordella et al. .............. | 713/189 |

FOREIGN PATENT DOCUMENTS

| | | |
|---|---|---|
| WO | 2006047694 A1 | 5/2006 |
| WO | 2010049778 A1 | 5/2010 |

OTHER PUBLICATIONS

Loprieno et al., "Optical Transport Network Encryption and Authentication," IP.com, Jan. 19, 2012, pp. 1-8.
Loprieno, et al., "Encryption Over ODU4," P.com, Jan. 30, 2012, pp. 1-9.
International Search Report and Written Opinion in counterpart International Application No. PCT/US2013/064943, mailed Jan. 8, 2014, 9 pages.

* cited by examiner

*Primary Examiner* — Amare F Tabor
(74) *Attorney, Agent, or Firm* — Edell, Shapiro & Finnan, LLC (57) ABSTRACT

An Optical Transport Network (OTN) frame comprises an optical channel payload unit that is divided into a plurality of timeslots. This OTN frame is received at a transmitter and the timeslots are grouped into blocks of timeslots. Two or more blocks of timeslots are selected for encryption and are encrypted/authenticated in parallel to generate an encrypted OTN frame in which only certain blocks of timeslots are encrypted.

25 Claims, 9 Drawing Sheets

TIMESLOT ENCRYPTION IN AN OPTICAL TRANSPORT NETWORK

TECHNICAL FIELD

The present disclosure relates to encryption of an optical transport network frame.

BACKGROUND

The International Telecommunication Union Telecommunication Standardization Sector (ITU-T) has developed a series of Optical Transport Network (OTN) standards for wavelength division multiplexed (WDM) networks. These standards cover the physical layer, signal rate, format, and equipment requirements for transmitting/receiving data across optical fiber channels. As used herein, an OTN is a network implemented in accordance with the ITU-T Recommendation G.709 standard for WDM signals.

OTNs are, in general, data networks comprised of nodes connected by optical fiber channels. OTNs provide dense wavelength division multiplexed (DWDM) links that allow for high data rates, multiplexing, switch management, supervision, and survivability of optical channels and signals. Given their high data rates, OTNs are well suited for applications requiring data transmissions across great distances.

DESCRIPTION OF EXAMPLE EMBODIMENTS

Overview

An Optical Transport Network (OTN) frame comprises an optical channel payload unit that is divided into a plurality of timeslots. This OTN frame is received at a transmitter and the timeslots are grouped into blocks of timeslots. Two or more blocks of timeslots are selected for encryption and are encrypted/authenticated in parallel to generate an encrypted OTN frame in which only certain blocks of timeslots are encrypted.

Example Embodiments

OTNs generally comprise a number of optical fibers that are deployed over large geographical areas. At times, the optical fibers are deployed in areas (e.g., unfriendly or hostile territories/countries) where it is difficult to provide secure access to the fibers. Given the large geographical area covered by OTNs, and the potentially unfriendly territories in which the optical fibers are deployed, OTNs may be exposed to eavesdroppers, hijackers, or other security threats. As such, operators protect the OTN payloads by adding security to the transmitted traffic, particularly for sensitive applications (e.g., datacenter long range connections, cloud computing, financial and military networks, etc.).

Several OTNs standards have been released and are referred to as OTU1, OTU2, OTU2e, OTU3, OTU3e2, and OTU4. OTU1 has a line rate of approximately 2.66 Gigabits per second (Gbps), OTU2 has a line rate of approximately 10.70 Gbps, OTU2e has a line rate of approximately 11.09 Gbps, OTU3 has a line rate of approximately 43.01 Gbps, OTU3e2 has a line rate of approximately 44.58 Gbps, and OTU4 has a line rate of approximately 112 Gbps. Optical transport is quickly moving towards 100 Gbps implementations that can be widely deployed in the next few years, and solutions for 400 Gbps and 1 terabits per second (Tbps) transport have been announced. As such, it is expected that further OTN standards will be released that support these and other line rates and signal speeds.

Certain encryption and authentication algorithms may be implemented in current silicon technology at a line rate of approximately 10 Gbps, but are difficult to implement at higher line rates. Additionally, higher security level algorithms that require complex calculations are generally not practical with current silicon technology at or above 10 Gbps. As such, the high data rates of OTNs present a challenge to data security and authentication using current silicon technology.

Presented herein are techniques that combine the high speed of optical transport with encryption. The OTN encryption techniques presented herein encrypt selected portions of an OTN payload using parallel encryption processes, thereby limiting the complexity of the encryption engines and allowing the implementation to scale to support higher bit rates. For ease of illustration, the OTN encryption techniques presented herein will be described with reference to OTU4. It is to be appreciated that the techniques presented herein may be implemented in conjunction with the other OTN standards or may be scaled for implementation with any future standards supporting even greater line rates and signal speeds.

The OTN frame structure defined in ITU-T Recommendation G.709 includes four (4) areas, namely: (1) the Optical Channel Payload Unit (OPU), (2) the Optical Channel Data Unit (ODU), (3) the Optical Channel Transport Unit (OTU), and (4) an area for a Forward Error Correction (FEC) code. The OPU is the area in which a payload is mapped, the ODU comprises the OPU with additional overhead bytes, and the OTU includes framing, a Trail Trace Identifier (TTI), a bit interleaved parity-8 (BIP-8) code, and General Communication Channel (GCC) bytes.

In accordance with the ITU-T Recommendation G.709, the OPU payload of an OTN frame is divided into a number of tributary slots (timeslots) each having a fixed width. For example, an OPU4 payload (the payload of a frame in accordance with OTU4) is divided into eighty (80) 1.25 G timeslots (numbered 1 to 80). The eighty OPU4 1.25 G timeslots are byte interleaved in the OPU4 payload area and the eighty OPU4 Tributary Slot Overheads (TSOHs) are frame interleaved in the OPU4 overhead (OH) area. The TSOH for a 1.25 G tributary slot is available once every eighty frames. The OTN encryption techniques presented herein encrypt/authenticate only selected timeslots or groups/blocks of timeslots within an OTN frame. For this reason, the OTN encryption techniques presented herein can be used for 100 G (OTU4/ODU4/OPU4), as well as for lower order (OTU3, OTU2) or higher order OTN containers.

Figure 1:
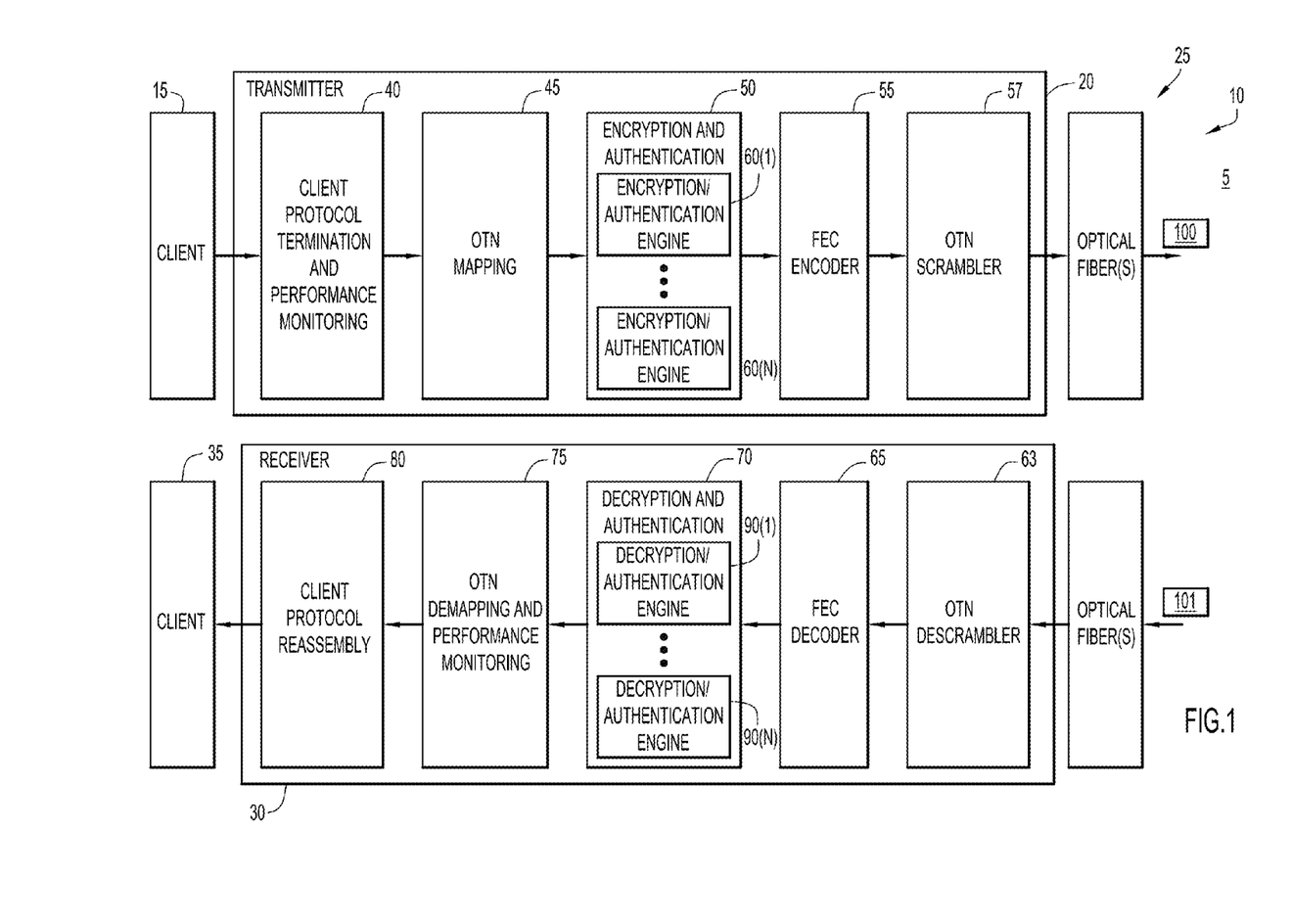
FIG. 1 is a block diagram of an example OTN line card from which encrypted and authenticated data is transmitted according to the techniques presented herein.

FIG. 1 is a block diagram of an example OTN shown at reference numeral 5 across which an OTN line card 10 transmits/receives encrypted and authenticated data according to the techniques presented herein. The OTN line card 10 of FIG. 1 comprises a transmitting device (transmitter) 20 that is coupled to a source client 15, and a receiving device (receiver) 30 coupled to a destination client 35. The transmitter 20 and receiver 30 are connected to one or more optical fibers 25.

Transmitter 20 comprises a client protocol module 40, an OTN or OPU mapping module 45, an encryption and authentication module 50, an FEC encoder module 55, and an OTN scrambler 57. Encryption and authentication module 50 comprises a plurality of encryption/authentication engines 60(1)-60(N). Receiver 30 comprises an OTN descrambler 63, an FEC decoder module 65, a decryption and authentication module 70, an OTN or OPU demapping module 75, and a client protocol module 80. Decryption and authentication module 70 comprises a plurality of decryption/authentication engines 90(1)-90(N).

Source client 15 provides data to client protocol module 40 of transmitter 20. Client protocol module 40 terminates the client protocol and conducts performance monitoring operations. As noted above, according to the latest OTN standard (e.g., the latest ITU-T Recommendation G.709), the OPU payload is divided into 80 1.25 G timeslots. As such, at OTN mapping module 45, the data from the terminated client signal is mapped into the OPU payload timeslots.

More specifically, in one example, the OPU4 payload comprises 4 (rows)×3800 (columns) bytes for client data and 4×8 bytes with fixed information. In row 1 of the OPU4 frame, the first 80 bytes will be labeled 1, the next 80-bytes will be labeled 2, etc. Groups of six hundred and forty successive bits of the client signal are mapped into a group of 80 successive bytes of the OPU4 payload area under control of the Generic Mapping Procedure (GMP) data/stuff control mechanism. Each group of 80 bytes in the OPU4 payload area may either carry 640 client bits, or carry 640 stuff bits. Bytes 3817 to 3824 are stuffing bytes with fixed stuff. The stuffing bytes may be set to zero.

The mapped OPU is provided to the encryption and authentication module 50. In accordance with the encryption techniques presented herein, the encryption and authentication module 50 is configured to apply the encryption/authentication operations only to selected timeslots (or groups of timeslots) of the OPU payload, thus limiting the computational load of the transmitter 20. In these examples, the multiple encryption/authentication engines 60(1)-60(N) are configured to operate in parallel to encrypt and authenticate different timeslots of the OPU payload. Further details of these parallel encryption/authentication operations are provided below.

The FEC encoder module 55 generates an FEC code for the OPU. The FEC code is, for example, a Reed-Solomon code calculated across the payload (OPU) columns. The FEC code allows detection and correction of bit errors due to signal impairments during transmission. The OTN scrambler 57 uses the encrypted OPU and the FEC code to generate a packet 100 that is transmitted across one or more optical fibers 25.

As shown in FIG. 1, the receiver 30 may also receive a packet 101. In such examples, the OTN descrambler 63 deconstructs the packet 101 to obtain the FEC code and the encrypted OPU. The deconstructed information is provided to FEC decoder module 65 for FEC correction. The encrypted OPU is then provided to decryption and authentication module 70.

Similar to encryption and authentication module 50, decryption and authentication module 70 includes multiple decryption/authentication engines 90(1)-90(N) that each decrypt and authenticate one or groups/blocks of the timeslots of the OPU payload in parallel.

The decrypted OPU is provided to the OTN demapping module 75 that parses the OPU, conducts performance monitoring operations, and provides the data extracted from the decrypted OPU to client protocol module 80. The client protocol module 80 re-assembles the data into a format for delivery to the destination client 35.

Figure 2:
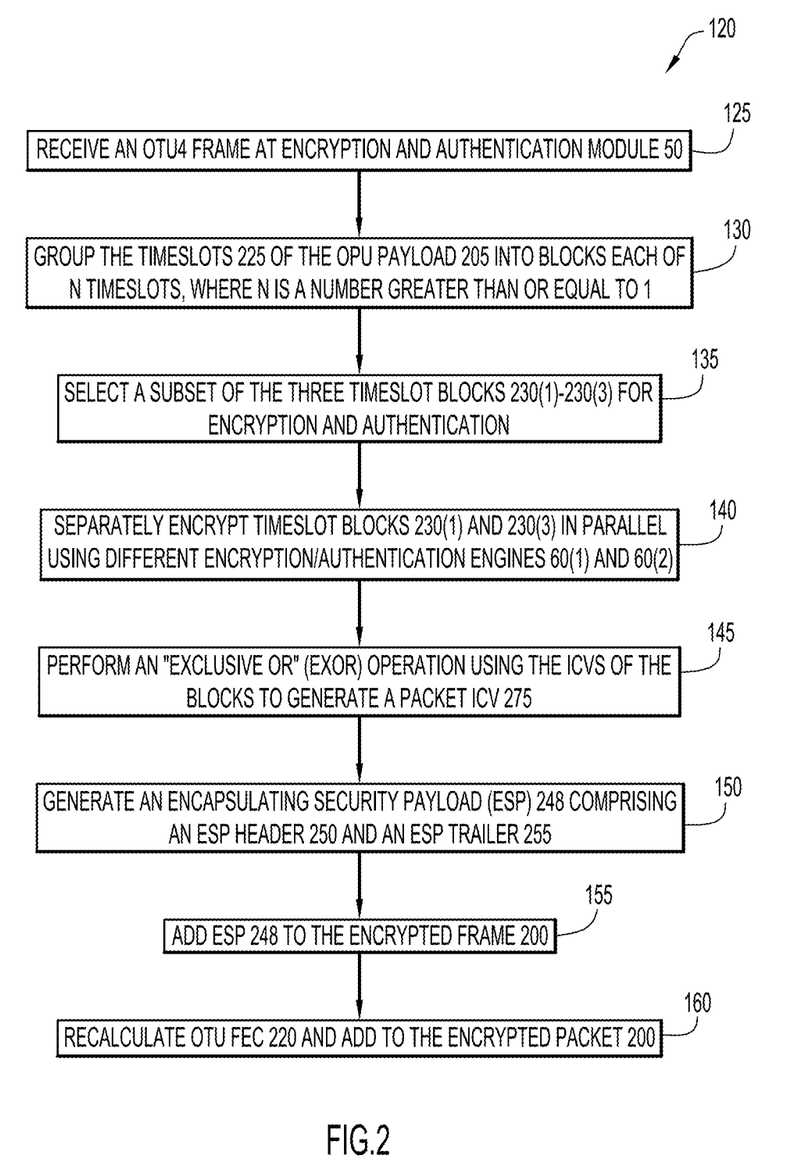
FIG. 2 is a flowchart of a method for encrypting/authenticating an OTN frame for transmission across an OTN.
Figure 3A:
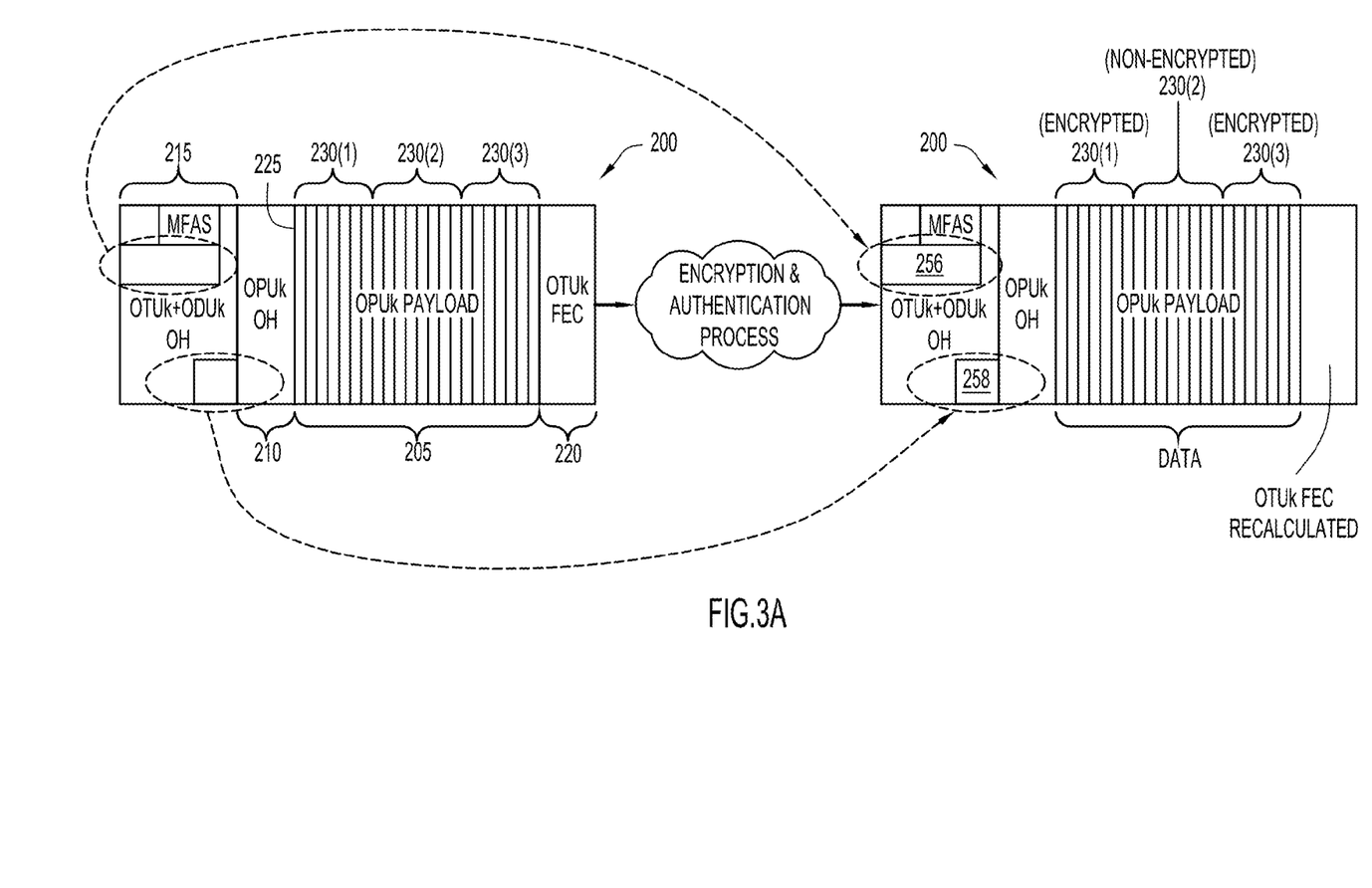
FIGS. 3A and 3B are schematic diagrams illustrating OTN frames before and after example encryption/authentication operations.
Figure 3B:
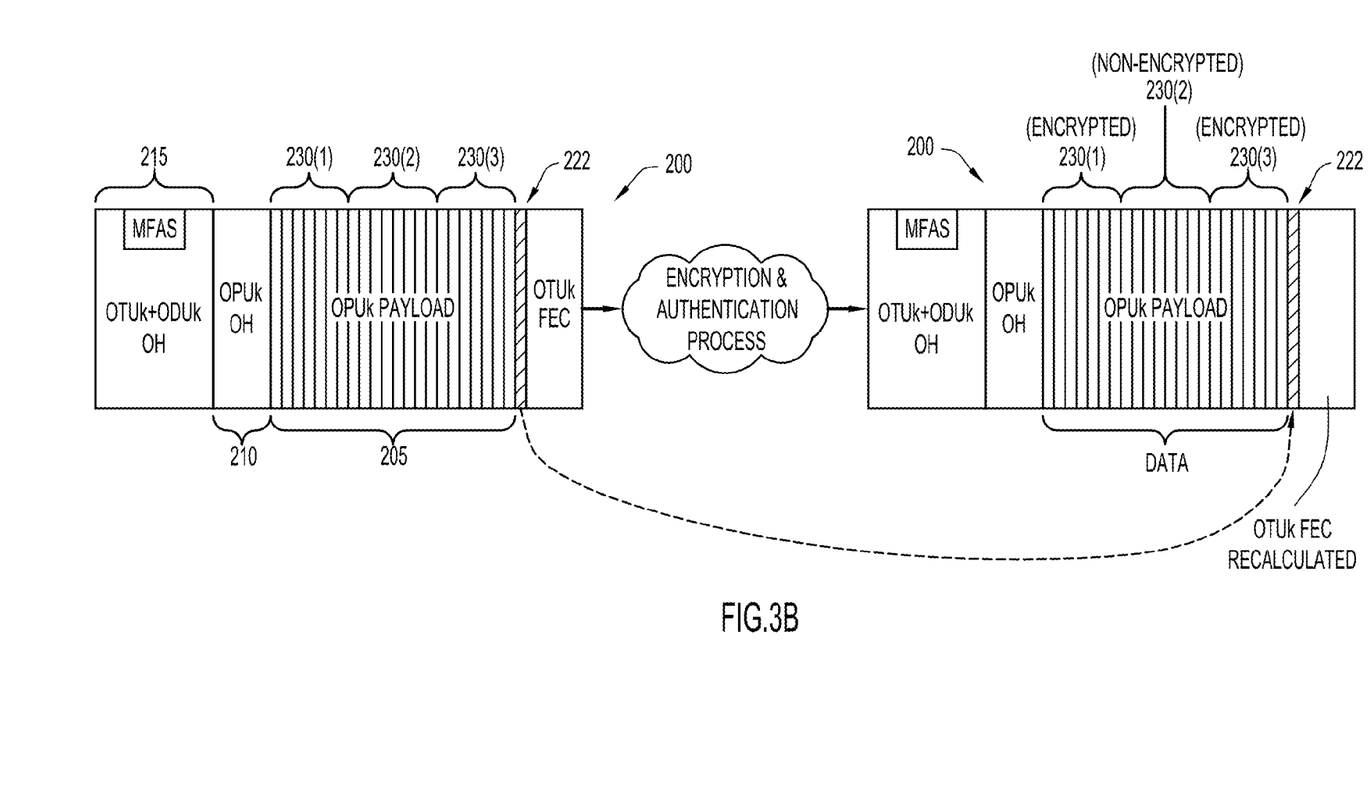
Figure 4:
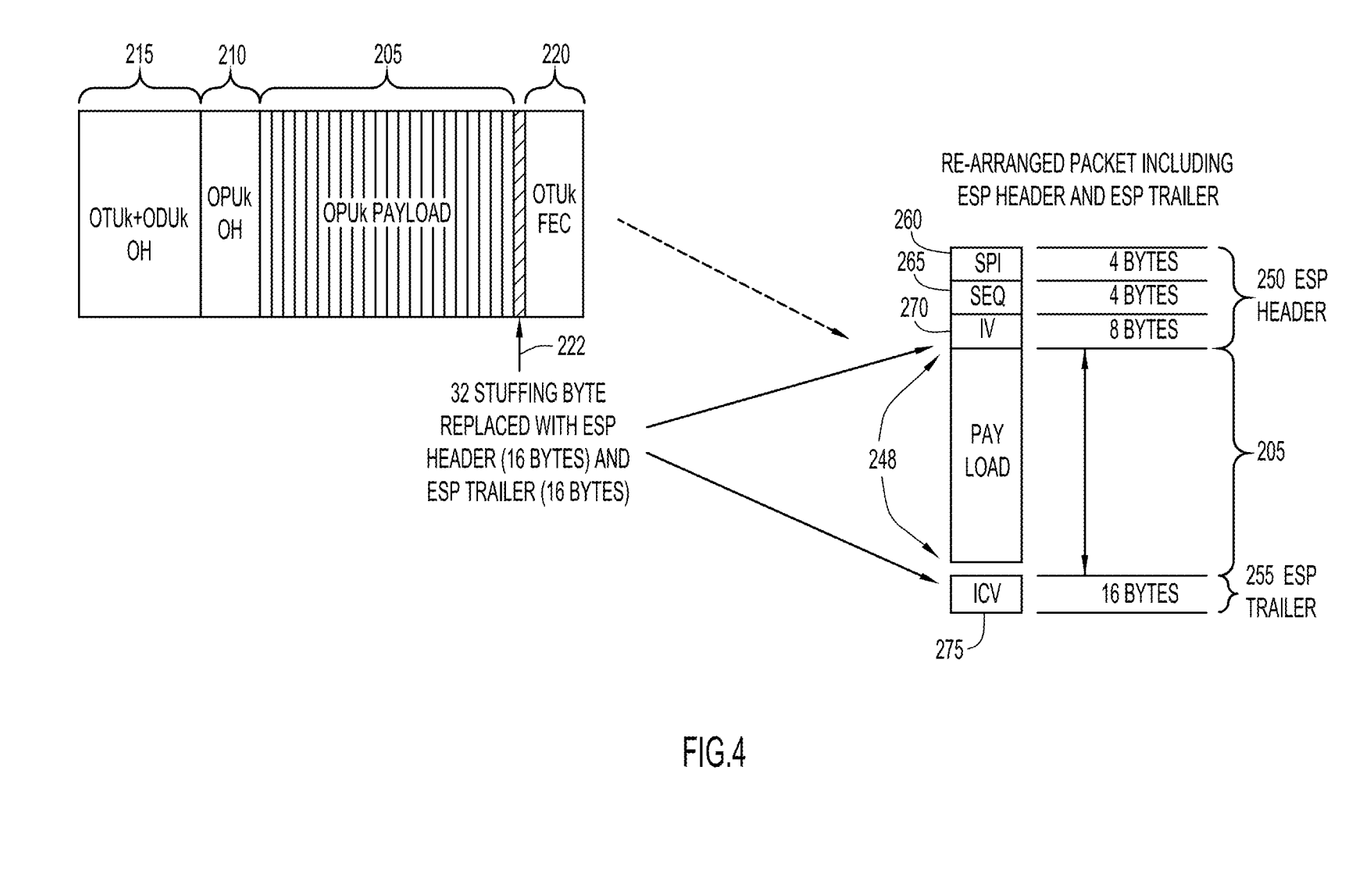
FIG. 4 is a schematic diagram illustrating the addition of header/trailer information to an encrypted OTN frame.

FIG. 2 is a flowchart illustrating a method 120 performed at a transmitter to encrypt data for transmission across an OTN in accordance with examples presented herein. For ease of illustration, the method 120 will be described with reference to the elements of transmitter 20 of FIG. 1 and with reference to FIGS. 3A, 3B and 4. FIGS. 3A and 3B are schematic diagrams illustrating an OTU packet before and after the encryption/authentication operations. FIG. 4 is a schematic diagram illustrating the mapping of header/trailer information to an OTU packet.

Method 120 begins at 125 where an OTU4 frame is received at encryption and authentication module 50. FIGS. 3A and 3B illustrate an example OTU4 frame 200. The OTU4 frame 200 is defined in ITU-T Recommendation G.709 to include an OPU payload 205, OPU overhead (OH) bytes 210, OTU and ODU OH bytes 215, an OTU FEC code 220, and thirty-two (32) stuffing bytes 222. The OPU payload 205 is divided into 80 1.25 G timeslots 225 into which client data is mapped. For ease of illustration, only a limited number of the 80 timeslots 225 are shown in FIGS. 3A and 3B.

At 130 in FIG. 2, the timeslots 225 of the OPU payload 205 are grouped into blocks, each of N timeslots, where N is a number greater than or equal to 1. FIGS. 3A and 3B illustrate grouping of the OPU payload 205 into three blocks of timeslots 230(1), 230(2), and 230(3).

In general, the minimum element on which the encryption/authentication engines 60(1)-60(N) can operate is one timeslot (1.25 Gbit/s). As such, using the granularity of 1.25 Gbps, the mechanism can scale up to N×1.25 Gbs, where N is determined by the available silicon technology used for executing these techniques. Depending on the capability of the processing chip, the encryption can be applied to an aggregate of timeslots.

At 135, a subset of the three timeslot blocks 230(1)-230(3) is selected for encryption and authentication. This selection process may be a feature that is pre-provisioned on the transmitter 20 and may be based on a number of different factors. For example, the OPU payload 205 may include different types of data (e.g., webpage, email, banking, etc.) or data associated with different customers. However, only certain types of data or only data from certain customers should be encrypted and authenticated. For example, it may be unnecessary to encrypt webpage information associated with a first customer, but email data associated with a second customer and banking data associated with a third customer should be encrypted and authenticated. As such, in certain examples, the transmitter 20 is configured to identify one of the source (customer) of the data or the type of the data in a block of timeslots and determine if the block of timeslots should be encrypted and authenticated. The traffic may be, in one example, marked with a payload type or other descriptor that the transmitter 20 could use to determine if blocks of timeslots should be encrypted.

In one specific example, a Multiplex Structure Identifier (MSI) in an OTN frame is used to indicate the composition of the timeslot blocks (i.e., the MSI identifies which timeslot transports which traffic). The MSI identifier(s) may be examined to determine which blocks of timeslots should be encrypted. Additionally, explicit provisioning by a network management system (NMS) or GCC channels can be used to indicate to the far end (receiver) the timeslots that are encrypted and which of the timeslots are not encrypted.

At 140, timeslot blocks 230(1) and 230(3) are separately encrypted and authenticated in parallel by different encryption/authentication engines 60(1) and 60(2), while timeslot block 230(2) is not encrypted and authenticated. The encryption/authentication engines 60(1) and 60(2) may use the same or different encryption and authentication processes to encrypt/authenticate the timeslot blocks 230(1) and 230(3), respectively. Additionally, the encryption/authentication engines 60(1) and 60(2) may use any encryption/authentication algorithms or methods now known or later developed to encrypt the timeslot blocks 230(1) and 230(3), respectively. For example, encryption techniques may be implemented to perform encryption over ODU4 timeslots by arranging the frame to support an Internet Protocol Security (IPsec)-type of security developed for packet traffic. IPSec defines an Encapsulating Security Payload (ESP) Header for Encryption and an ESP Trailer Integrity Check Value (ICV) for Authentication. Accordingly, the Inter Frames Gap (idle ordered_sets) is removed to make room for additional fields (tagging) to support encryption and authentication. In the case of ODU4, the stuffing bytes (32 bytes) are filled with ESP Header and ESP Trailer bytes described further below. Sixteen bytes of ESP header are transported over the stuffing bytes of the first two rows, while sixteen bytes of ICV are transported over the remaining stuffing bytes (rows 3 and 4). In this way, all overhead that mimics IPSec is fit inside a single OTU4 frame.

In the example of FIG. 2, the encryption/authentication engines 60(1) and 60(2) use the same encryption key and the same "nonce" (arbitrary number used only once) during the parallel encryption operations. As shown in FIGS. 3A and 3B, after the encryption process the OTU4 frame 200 includes two encrypted blocks of timeslots (blocks 230(1) and 230(3)) and one non-encrypted block of timeslots (block 230(3)).

The timeslot blocks 230(1) and 230(3) are each associated with a separate ICV. However, because timeslot block 230(2) is not encrypted/authenticated, this block of timeslots is not associated with an ICV. At 145 (FIG. 2), an "exclusive or" (EXOR) operation is performed using the ICVs of the encrypted/authenticated blocks (blocks 230(1) and 230(3)) to generate a frame ICV 275 that is used for frame authentication at receiver 30.

At 150, an ESP 248 comprising an ESP header 250 and an ESP trailer 255 is generated. The ESP 248, ESP header 250, and ESP trailer 255 are shown in FIG. 4. The ESP header 250 is used for encryption information and includes the security parameter index (SPI) 260, Sequence (SEQ) 265, and Integrity Value (IV) 270. The ESP trailer 255 is used for authentication information and includes the frame ICV 275.

At 155, the ESP 248 is added to the encrypted frame 200. There are several different methods for adding the ESP 248 to the encrypted frame 200. More specifically, as shown in FIG. 3A, the ESP header 250 and the ESP trailer 255 may be mapped into the OTU OH as two separate 16 bytes blocks. In FIG. 3A, block 256 represents the mapping of the ESP header 250 (4 bytes for the SPI, 4 bytes for the SEQ, and 8 bytes for the IV) and block 258 represents the mapping of the ESP trailer 255. Alternatively, as shown in FIG. 3B, the OTU4 packet 200 includes 32 stuffing bytes 222 of fixed stuff (4 rows by 8 columns from 3817 to 3824). These stuffing bytes 222 are reserved bytes that do not carry packet processing information. As such, in the examples shown in FIG. 3B, the stuffing bytes 222 are replaced by the ESP 348. In particular, sixteen (16) of the stuffing bytes 222 are replaced by the ESP header 250 (4 bytes for the SPI, 4 bytes for the SEQ, and 8 bytes for the IV) and sixteen (16) of the stuffing bytes 222 are replaced by the ESP trailer 255. At 160, the OTU FEC 220 is recalculated and added to the encrypted frame 200.

Figure 5:
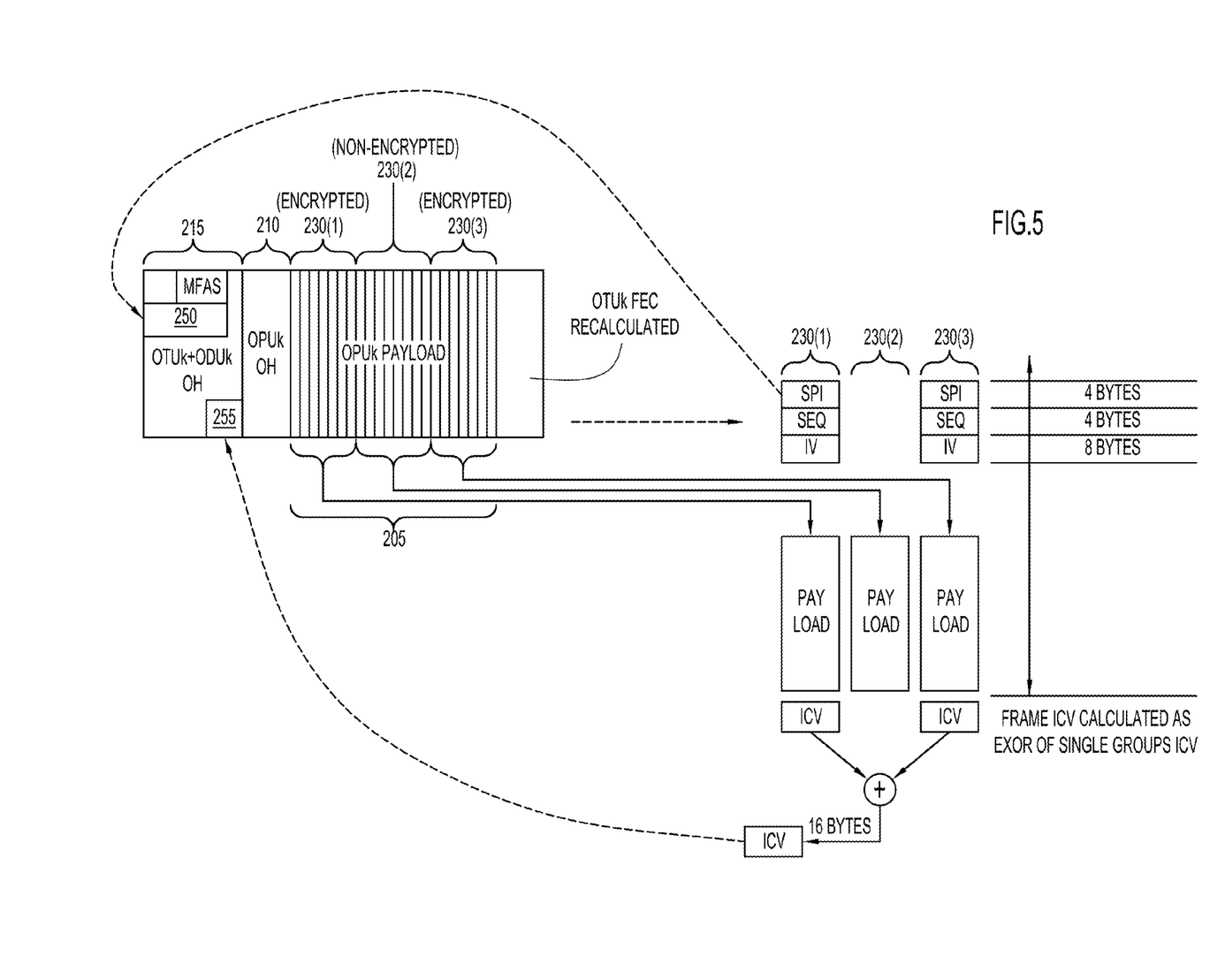
FIG. 5 is a block diagram schematically illustrating the mapping of a header and trailer into an encrypted OTN frame.

FIG. 5 is a block diagram schematically illustrating the mapping of the ESP header 250 and ESP trailer 255 into the encrypted frame 200 in accordance with the examples of FIG. 3A (i.e., where the ESP header 250 and the ESP trailer 255 may be mapped into the OTU OH as two separate 16 bytes blocks). The multiframe alignment signal (MFAS) 280 is also shown in the OTU and ODU OH bytes 215.

Figure 6:
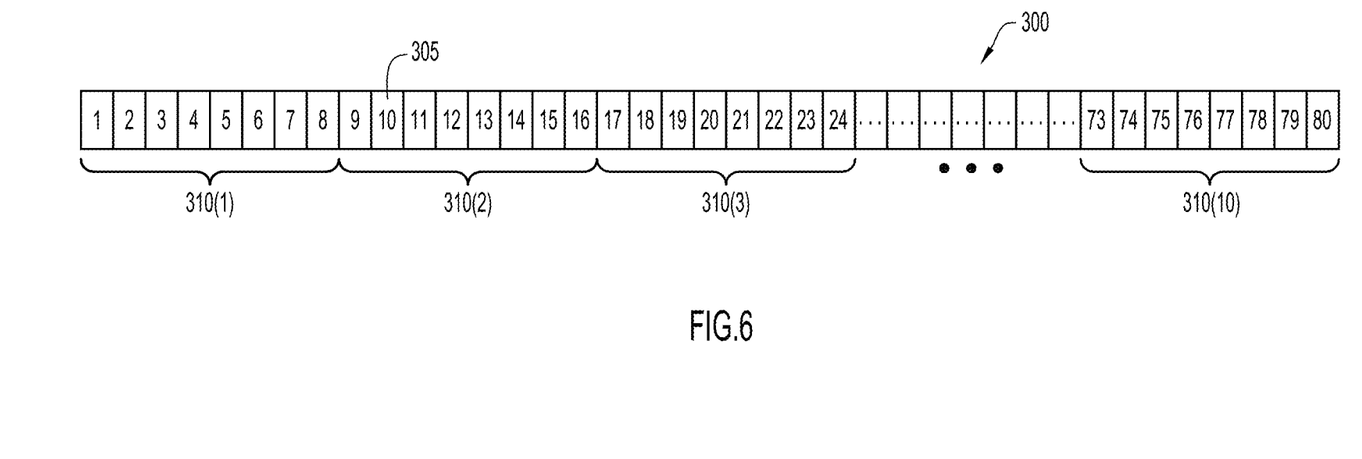
FIG. 6 is a schematic diagram of an OTN payload having eighty (80) timeslots.

FIG. 6 is a schematic diagram of an OPU4 payload 300 having 80 timeslots 305. With encryption/authentication engines that are able to operate at a line rate of 10 Gbps, eight timeslots can be chosen as a base entity for encryption operations. In this case, in accordance with the examples of FIG. 6, 100 G traffic may be split into 10 blocks 310(1)-310(10), each including 8 timeslots of 1.25 G. Following this example, encryption of 10 G traffic transported inside an OTU4 frame may be treated as a single block (8 timeslots) and encryption of 40 G traffic is operated as 4 blocks of 10 G (i.e., 4×8×1.25 G). The parallel approach of the techniques presented herein limits the complexity of the encryption engines, while allowing the implementation to scale to higher bit rates. In the example of FIG. 6, only blocks 310(1), 310(3), and 310(10) are encrypted prior to transmission.

Figure 7:
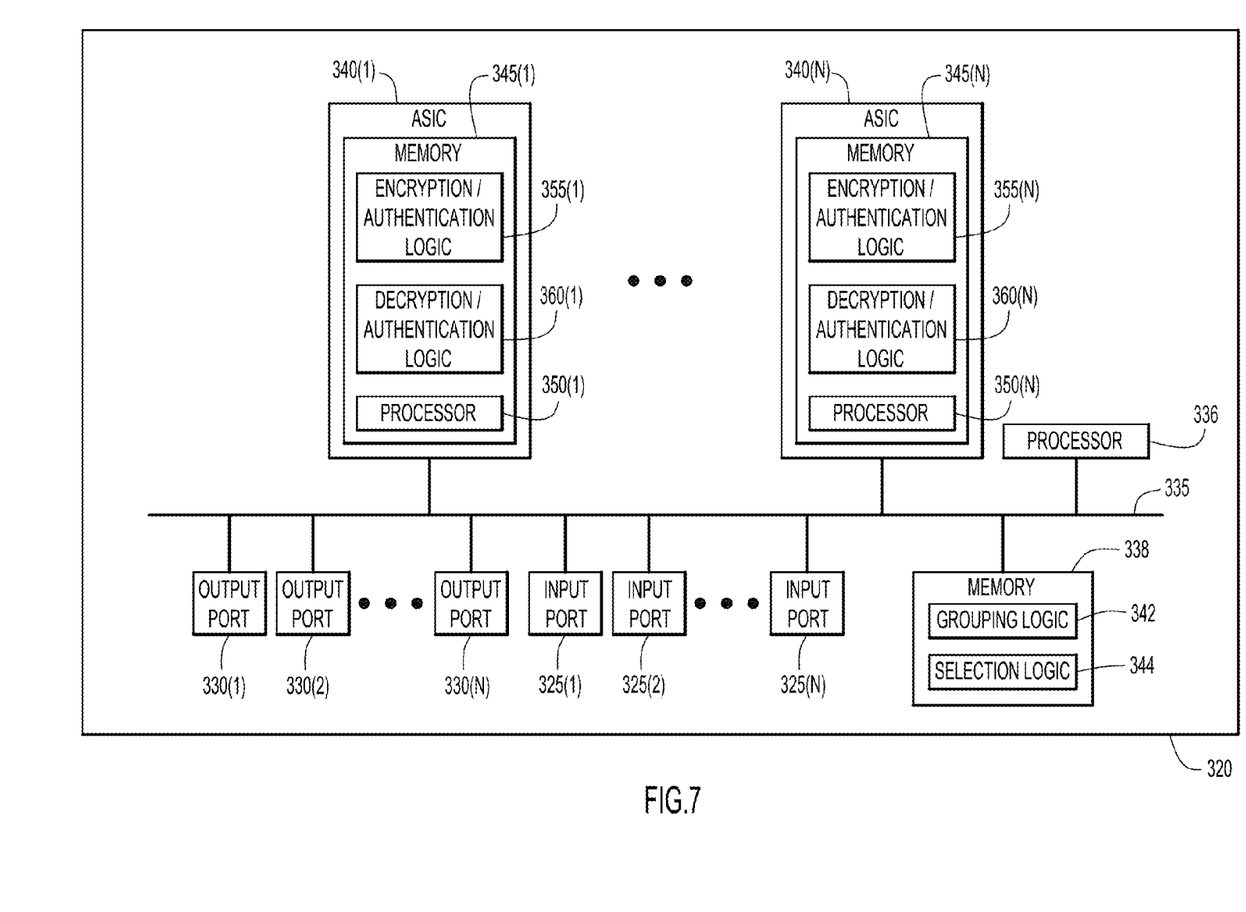
FIG. 7 is a block diagram of an apparatus configured to perform the timeslot encryption techniques presented herein.

FIG. 7 is a block diagram of an example apparatus 320 configured to perform the encryption and decryption techniques described herein. Thus, the apparatus 320 may serve as a transmitter and/or a receiver of an OTN frame. The apparatus 320 comprises one or more input ports 325(1)-325(N), one or more output ports 330(1)-330(N), a bus 335, a processor 336, a memory 338, and a plurality of subsystems 340(1)-340(N). The subsystems 340(1)-340(N) are, in this example, separate application specific integrated circuits (ASICS). ASICs 340(1)-340(N) each comprise a memory 345(1)-345(N), respectively, and a processor 350(1)-350(N), respectively. Memories 345(1)-345(N) each comprise encryption/authentication logic 355(1)-355(N), respectively, and decryption/authentication logic 360(1)-360(N), respectively. Memory 338 comprises grouping logic 342 and selection logic 344.

The input ports 325(1)-325(N) are configured to receive optical signals on optical fibers and convert the optical signals to digital electrical signals for decryption processing. The one or more output ports 330(1)-330(N) are configured to convert encrypted digital electrical signals to optical signals for transmission across an optical fiber. The input ports 325(1)-325(N) and output ports 330(1)-330(N) are coupled to bus 335. ASICs 340(1)-340(N), processor 336, and memory 338 are also coupled to bus 335.

Memories 345(1)-345(N) and memory 338 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memories 345(1)-345(N) and 338 may comprise one or more tangible (non-transitory) computer readable storage media (e.g., a memory device) encoded with software comprising computer executable instructions. The processors 350(1)-350(N) and 336 are, for example, microprocessors or microcontrollers that execute the computer executable instructions in memories 345(1)-345(N) and 338.

In operation, the grouping logic 342, when executed by processor 336, groups the timeslots in an OPU payload into a selected number of blocks, as described above. The selection logic 344, when executed by processor 336, selects certain blocks for encryption, also as described above. The ASICS 340(1)-340(N) execute encryption/authentication logic 355(1)-355(N), respectively, and decryption/authentication logic 360(1)-360(N), respectively, to provide parallel encryption/decryption engines, as described above. In other words, each ASIC 340(1)-340(N) is configured to, when operating as a transmitter, encrypt a block of selected OPU timeslots, as described above, for transmission. Similarly, when operating as a receiver, each ASIC 340(1)-340(N) is configured to decrypt a block of selected OPU timeslots, as described above.

FIG. 7 illustrates an example in which the encryption/authentication logic 355(1)-355(N) and the decryption/authentication logic 360(1)-360(N) are embodied as software instructions stored in memories 345(1)-345(N), respectively, and executed by processors 350(1)-35(N), respectively. Alternatively, encryption/authentication logic 355(1)-355(N) and the decryption/authentication logic 360(1)-360(N) may be implemented in hardware, such as by digital logic gates, or in programmable logic, such as in one or more field programmable gate arrays (FPGAs). Additionally, examples presented herein may include ASICs that are each configured to operate as two or more parallel encryption/decryption engines (i.e., there may not be a one-to-one correspondence between encryption/decryption engines and the number of ASICs).

The apparatus 320 may also comprise any combination of hardware and/or software configured to perform FEC encoding operations (FEC encoder module 55 of FIG. 1), FEC decoding operations (FEC decoder module 65 of FIG. 1), OTN mapping operations (OTN mapping module 45 of FIG. 1), OTN termination operations (OTN termination module 75 of FIG. 1), and the client protocol operations (client protocol modules 40 and 80 of FIG. 1). For ease of illustration, these hardware and/or software components have been omitted from FIG. 7.

Figure 8:
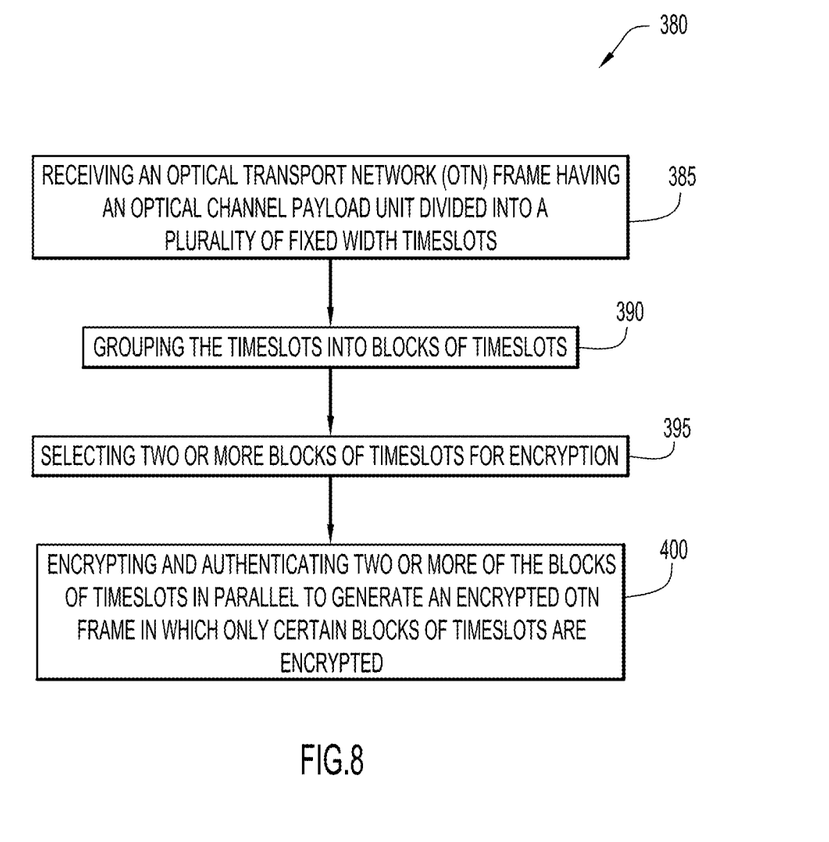
FIG. 8 is a high-level flowchart of a method for encrypting/authenticating an OTN frame for transmission across an OTN.

FIG. 8 is a high-level flowchart of a method 380 for encrypting/authenticating an OTN frame for transmission across an OTN. Method 380 begins at 385 where an OTN frame having an OPU is received. The OPU is divided into a plurality of fixed width timeslots. At 390, the timeslots are grouped into blocks of timeslots and, at 395, one or more blocks of timeslots are selected for encryption. Each block of timeslots may include a minimum of one timeslot. At 400, the one or more blocks of timeslots are encrypted and authenticated in parallel to generate an encrypted OTN frame in which only certain blocks of timeslots are encrypted.

Conventional encryption techniques for OTN frames result in the encryption of the full data stream at line rate. This process is complex and not possible at high bit rates. Presented herein are techniques to group N time slots into a container (block) to be processed by a security algorithm. The techniques encrypt/authenticate only selected timeslots or groups of timeslots and use multiple encryption/authentication engines to process data in parallel, avoiding the technical challenge of having a single encryption engine that operates at a high line rate. In this way, it is no longer necessary to have an encryption/decryption engine that runs at line rate. In certain examples, each group/encryption engine is concatenated with other groups and is working in parallel, but all will use the same overhead (ESP Header/Trailer) and same key. The techniques allow for reduced complexity of the digital logic/ASICs because encryption is applied to lower speed signals, complete transparent mapping, clock transparency, OTN backward compatibility, and transparency to installed regenerator blocks.

Using the techniques presented herein, operators can expand networks to include the ability to differentiate services (the end customer may or may not need encrypted traffic and the end customer will be billed according to the service level provided). More specifically, operators can differentiate services on a timeslot basis ("Pay as you Encrypt"). This approach can be used also for ODUflex connections where the size of the group (that is, the number of timeslots that compose the group) is not predetermined.

As noted, examples have been described with specific reference to OTU4. This is merely for ease of reference and it is to be appreciated that the techniques presented herein may be implemented in conjunction with other standards now known or later developed.

The above description is intended by way of example only.

What is claimed is:

1. A method comprising:
   receiving an optical transport network (OTN) frame having an optical channel payload unit divided into a plurality of timeslots;
   grouping the timeslots into blocks of timeslots;
   selecting two or more blocks of timeslots for encryption, wherein each block of the two or more blocks of timeslots comprises an equal number of timeslots; and
   encrypting and authenticating the two or more blocks of timeslots in parallel to generate an encrypted OTN frame in which only certain blocks of timeslots are encrypted.

2. The method of claim 1, wherein selecting the two or more blocks of timeslots for encryption comprises:
   examining a Multiplex Structure Identifier signifying the composition of the blocks to select the two or more blocks of timeslots.

3. The method of claim 1, further comprising:
   encrypting and authenticating each of the two or more blocks of timeslots in parallel with separate encryption/authentication processes.

4. The method of claim 1, further comprising:
   encrypting and authenticating each of the two or more blocks of timeslots using the same encryption key and the same arbitrary number used only once (nonce).

5. The method of claim 1, wherein each of the two or more blocks of timeslots is associated with an integrity check value, and further comprising:
   performing an exclusive-or operation using the integrity check values associated with each of the two or more blocks of timeslots to generate a frame integrity check value.

6. The method of claim 1, further comprising:
   generating an Encapsulating Security Payload (ESP) comprising an ESP header including encryption information and an ESP trailer including authentication information; and
   adding the ESP to the encrypted OTN frame.

7. The method of claim 1, further comprising:
   calculating a forward error correction (FEC) code for the encrypted OTN frame; and
   adding the FEC to the OTN frame.

8. The method of claim 1, further comprising:
   transmitting the encrypted OTN frame to a receiver; and at the receiver, decrypting and authenticating each of the two or more blocks of timeslots in parallel with separate decryption/authentication processes.

9. The method of claim 8, further comprising:
transmitting to the receiver via a general communications channel information that identifies the two or more blocks of timeslots that have been encrypted.

10. An apparatus, comprising:
a memory;
a processor coupled to the memory, and configured to:
obtain an optical transport network (OTN) frame having an optical channel payload unit divided into a plurality of timeslots,
group the timeslots into blocks of timeslots, and
select two or more blocks of timeslots for encryption, wherein each block of the two or more blocks of timeslots comprises an equal number of timeslots; and
a plurality of subsystems configured to encrypt and authenticate the two or more blocks of timeslots in parallel to generate an encrypted OTN frame in which only certain blocks of timeslots are encrypted.

11. The apparatus of claim 10, wherein the processor is configured to select the two or more blocks of timeslots for encryption by examining a Multiplex Structure Identifier signifying the composition of the blocks to select the two or more blocks of timeslots.

12. The apparatus of claim 10, wherein the plurality of subsystems comprise a plurality of application specific integrated circuits (ASICs) each configured to encrypt and authenticate one of the two or more blocks of timeslots in parallel.

13. The apparatus of claim 10, wherein the plurality of subsystems are configured to encrypt and authenticate each of the two or more blocks of timeslots using the same encryption key and the same arbitrary number used only once (nonce).

14. The apparatus of claim 10, wherein each of the two or more blocks of timeslots is associated with an integrity check value, and wherein the processor is configured to perform an exclusive-or operation using the integrity check values associated with each of the two or more blocks of timeslots to generate a frame integrity check value.

15. The apparatus of claim 10, wherein the processor is configured to generate an Encapsulating Security Payload (ESP) comprising an ESP header including encryption information and an ESP trailer including authentication information, and to add the ESP to the encrypted OTN frame.

16. The apparatus of claim 10, wherein the processor is configured to calculate a forward error correction (FEC) code for the encrypted OTN frame and add the FEC to the OTN frame.

17. The apparatus of claim 10, wherein the processor is configured to transmit the encrypted OTN frame to a receiver and transmit to the receiver via a general communications channel information that identifies the two or more blocks of timeslots that have been encrypted.

18. One or more non-transitory computer readable storage media encoded with software comprising computer executable instructions and when the software is executed operable to:
receive an optical transport network (OTN) frame having an optical channel payload unit divided into a plurality of timeslots;
group the timeslots into blocks of timeslots;
select two or more blocks of timeslots for encryption, wherein each block of the two or more blocks of timeslots comprises an equal number of timeslots; and
encrypt and authenticate the two or more blocks of timeslots in parallel to generate an encrypted OTN frame in which only certain blocks of timeslots are encrypted.

19. The non-transitory computer readable storage media of claim 18, wherein the instructions operable to select the two or more blocks of timeslots for encryption comprise instructions operable to:
examine a Multiplex Structure Identifier signifying the composition of the blocks to select the two or more blocks of timeslots.

20. The non-transitory computer readable storage media of claim 18, further comprising instructions operable to:
encrypt and authenticate each of the two or more blocks of timeslots in parallel with separate encryption/authentication processes executed by separate application specific integrated circuits (ASICs).

21. The non-transitory computer readable storage media of claim 18, further comprising instructions operable to:
encrypt and authenticate each of the two or more blocks of timeslots using the same encryption key and the same arbitrary number used only once (nonce).

22. The non-transitory computer readable storage media of claim 18, wherein each of the two or more blocks of timeslots is associated with an integrity check value, and further comprising instructions operable to:
perform an exclusive-or operation using the integrity check values associated with each of the two or more blocks to generate a frame integrity check value.

23. The non-transitory computer readable storage media of claim 18, further comprising instructions operable to:
generate an Encapsulating Security Payload (ESP) comprising an ESP header including encryption information and an ESP trailer including authentication information; and
add the ESP to the encrypted OTN frame.

24. The non-transitory computer readable storage media of claim 18, further comprising instructions operable to:
calculate a forward error correction (FEC) code for the encrypted OTN frame; and
add the FEC to the OTN frame.

25. The non-transitory computer readable storage media of claim 18, further comprising instructions operable to:
transmit the encrypted OTN frame to a receiver; and
transmit to the receiver via a general communications channel information that identifies the two or more blocks of timeslots that have been encrypted.

* * * * *